(No Model.) 4 Sheets—Sheet 1.

J. L. BUFORD.
DISTANCE MEASURING INSTRUMENT.

No. 534,993. Patented Mar. 5, 1895.

Witnesses
Percy C. Bowen
J. C. Wilson

Inventor
Jefferson L. Buford,
By Whitman & Wilkinson
Attorneys.

(No Model.) 4 Sheets—Sheet 2.
J. L. BUFORD.
DISTANCE MEASURING INSTRUMENT.
No. 534,993. Patented Mar. 5, 1895.
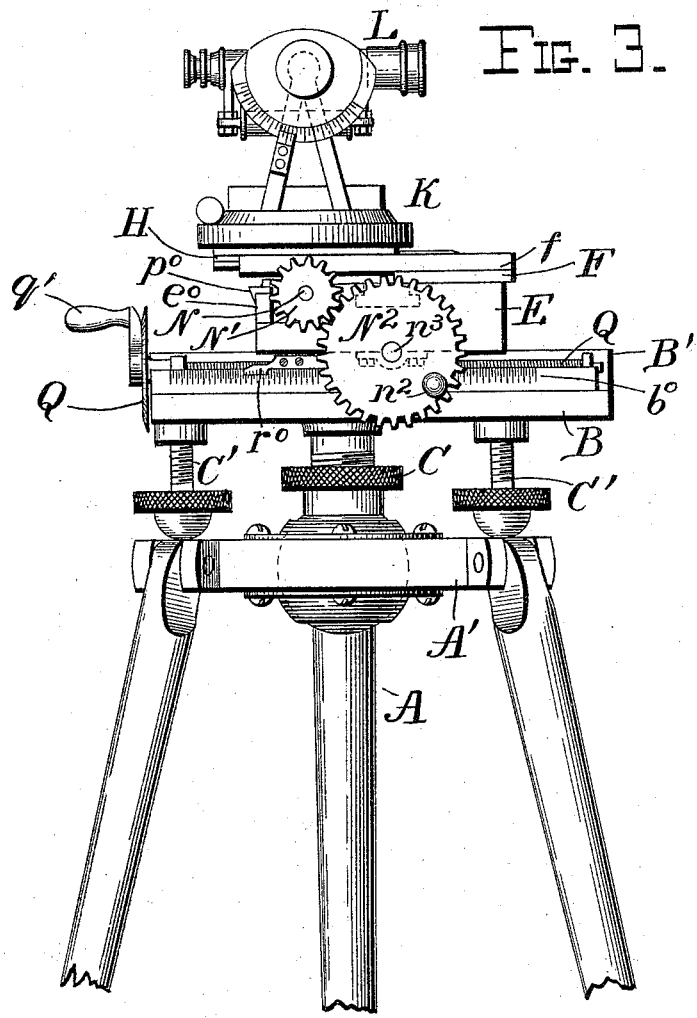
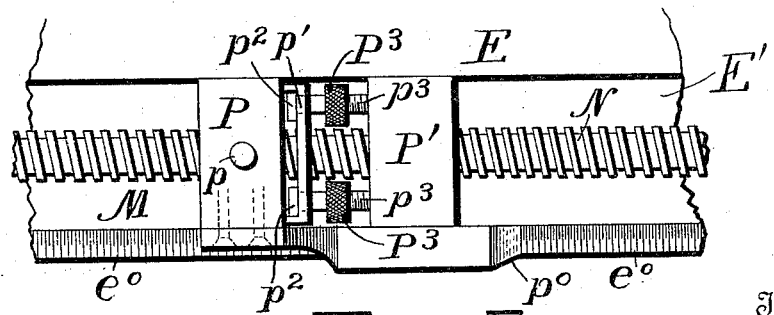

(No Model.) 4 Sheets—Sheet 3.
J. L. BUFORD.
DISTANCE MEASURING INSTRUMENT.
No. 534,993. Patented Mar. 5, 1895.
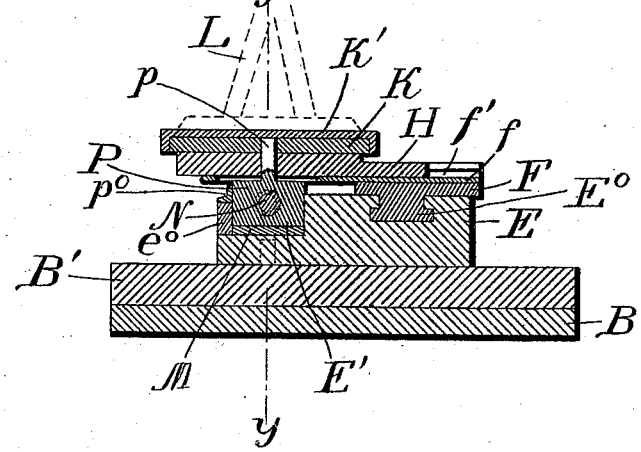
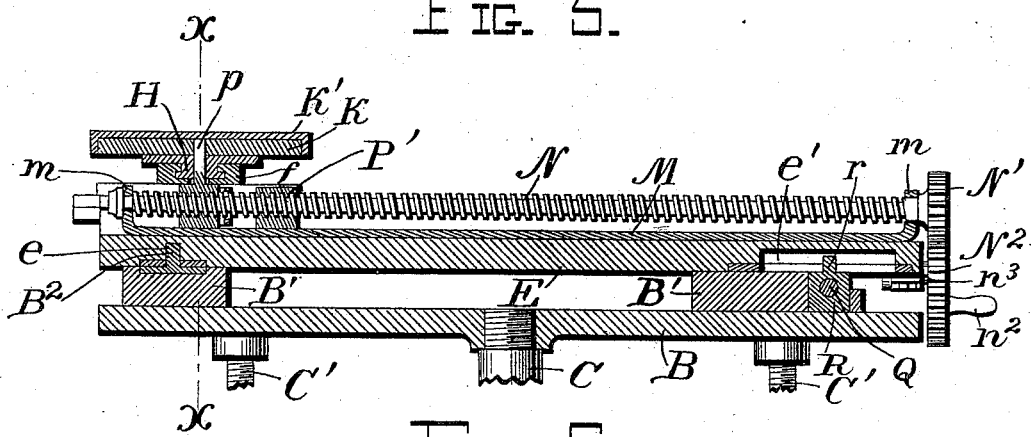
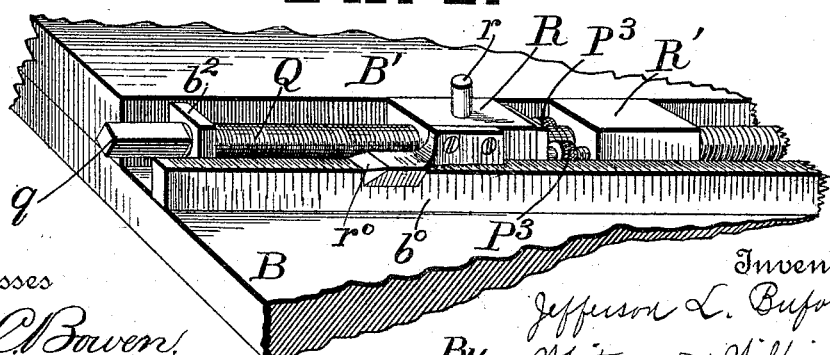

(No Model.) 4 Sheets—Sheet 4.
J. L. BUFORD.
DISTANCE MEASURING INSTRUMENT.
No. 534,993. Patented Mar. 5, 1895.
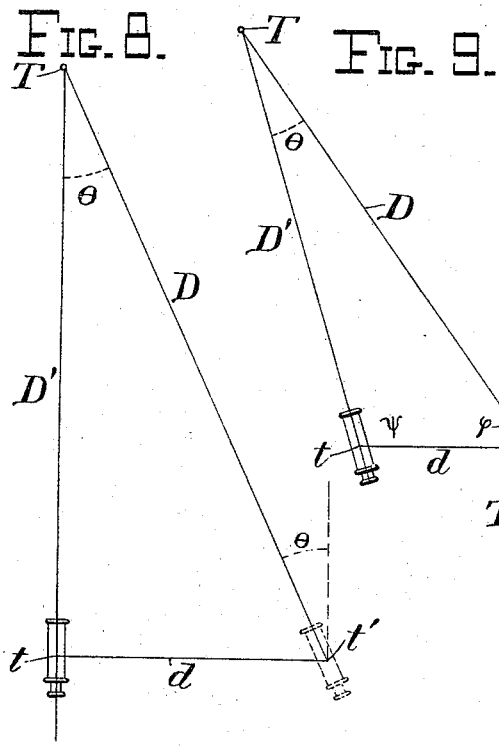
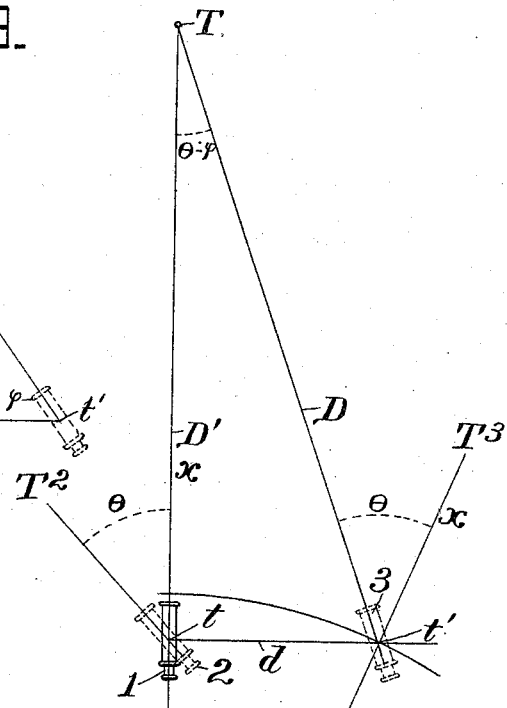
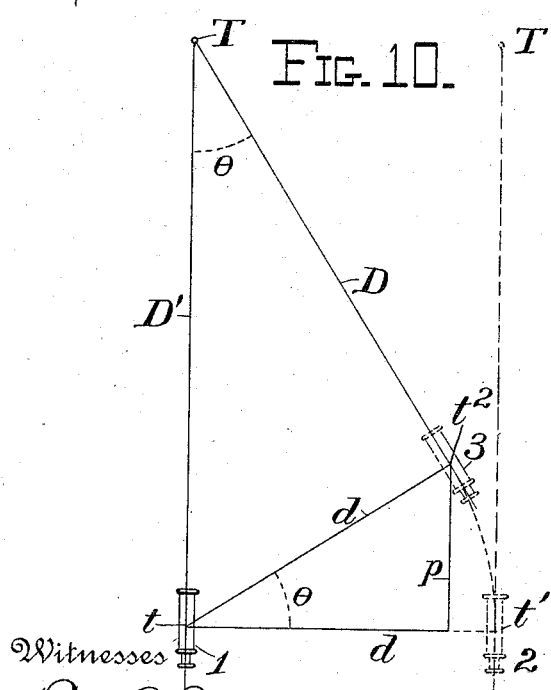
Witnesses
Rey C. Bowen
J. C. Wilson
Inventor
Jefferson L. Buford
By Whitman & Wilkinson
Attorneys

UNITED STATES PATENT OFFICE.

JEFFERSON L. BUFORD, OF BIRMINGHAM, ALABAMA.

DISTANCE-MEASURING INSTRUMENT.

SPECIFICATION forming part of Letters Patent No. 534,993, dated March 5, 1895.

Application filed April 25, 1894. Serial No. 508,973. (No model.)

*To all whom it may concern:*

Be it known that I, JEFFERSON L. BUFORD, a citizen of the United States, residing at Birmingham, in the county of Jefferson and State of Alabama, have invented certain new and useful Improvements in Distance-Measuring Instruments; and I do hereby declare the following to be a full, clear, and exact description of the invention, such as will enable others skilled in the art to which it appertains to make and use the same.

My invention relates to improvements in instruments for measuring distances, and angles, and it is especially intended to cover certain improvements upon the invention described in my application, Serial No. 478,624, filed June 23, 1893.

The said invention will be understood by reference to the accompanying drawings, in which the same parts are indicated by the same letters and figures.

Figure 1:
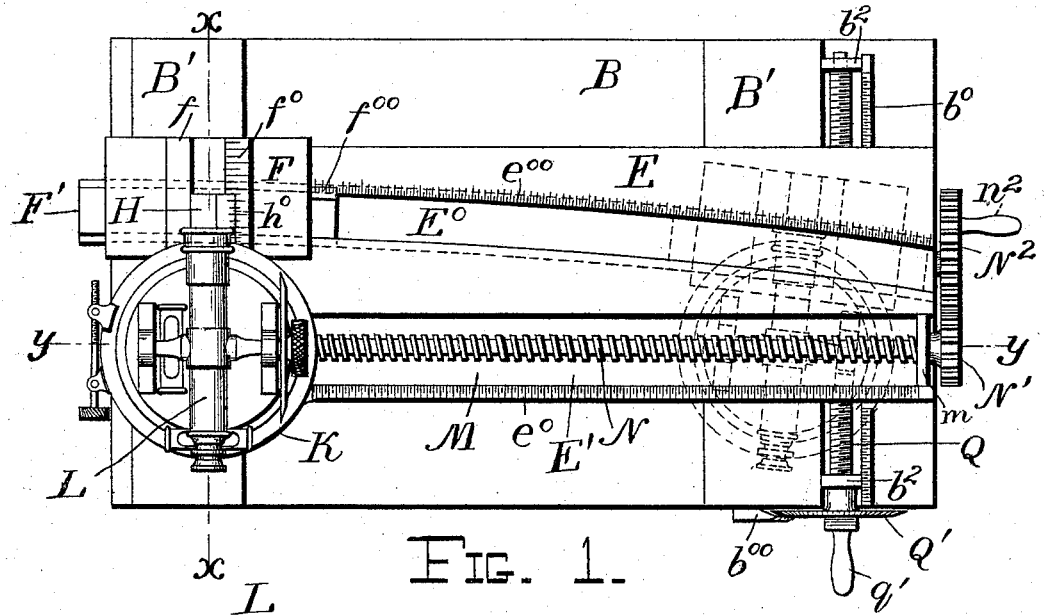
Figure 2:
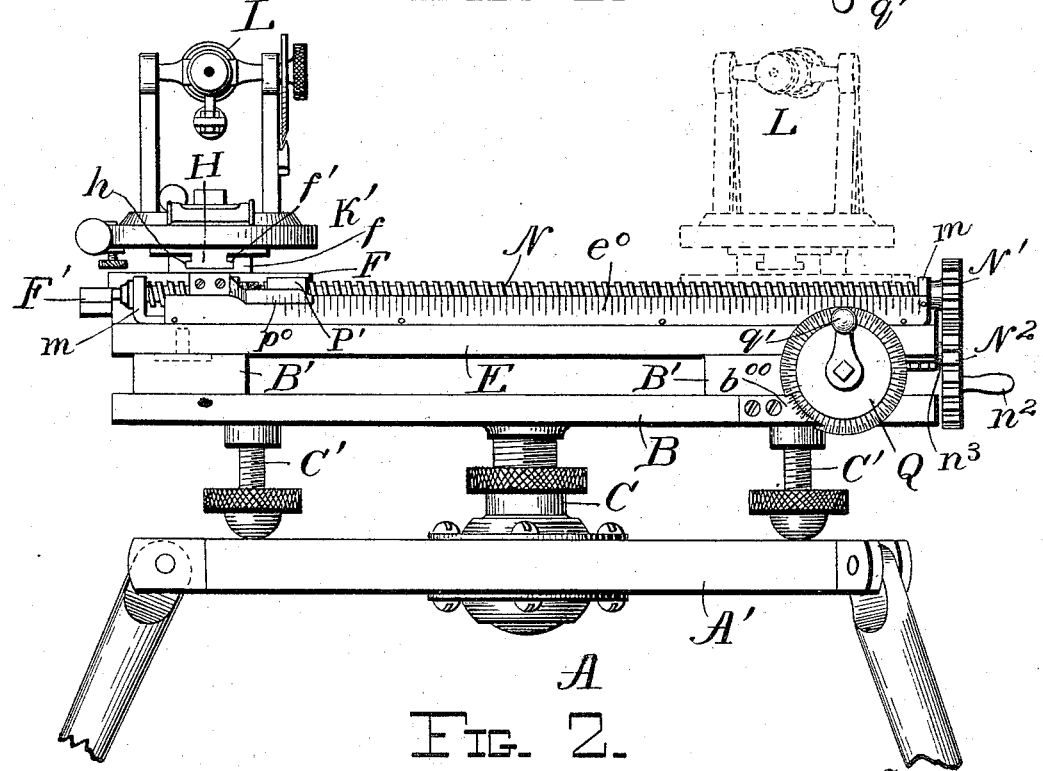

Figure 1 is a plan view of the instrument as detached from its tripod or other support. Fig. 2 is a rear view of the instrument, and the upper end of a tripod supporting the same. Fig. 3 represents a side elevation of the instrument mounted upon a tripod. Fig. 4 represents a section along the line $x\ x$ of Figs. 1 and 2. Fig. 5 represents a section along the line $y\ y$ of Fig. 1. Fig. 6 represents a perspective view of the screw and its connections for giving an angular motion to the telescope platform. Fig. 7 represents a detail view of screw and the nuts thereon which are coupled together and give lateral motion to the block carrying the telescope; and Figs. 8 to 11 are diagrammatic views illustrating the mode of measuring distances with the instrument herein described.

A represents a tripod carrying the supporting plate A' to which the telescope platform B is attached by means of the adjusting screws C and C'. Any other suitable support may be used for the platform B if desired. On top of this platform B, two transverse strips B' are secured, while on top of these strips B' the telescope platform E is pivoted as at $e$ on the pivot pin B², fast to one of the strips B'. This platform E is provided with an arc-shaped groove E⁰ on the upper surface thereof. This groove is in the form of an arc of a circle struck with a radius indicated by R in Fig. 11, preferably fifty or one hundred feet. Sliding in this groove E⁰ is a block F, which block and groove are preferably made dovetailed or having a cross section in the form of an inverted T as shown in Fig. 4, so that the block may not accidentally fall or be knocked out of said groove. Mounted in a groove $f'$ in the upper portion of said block F, is a second block H having its base $h$ dovetailed or in the form or an inverted T so that it may be firmly held in said groove. Mounted over this block H and pivotally connected thereto, are the plates K and K' of the theodolite or surveyor's transit L. This theodolite or transit is constructed in the ordinary way, and is provided as is customary with six cross-hairs in equidistant groups at right angles to each other and adapted for use with the stadia or other similar instrument.

Near the rear edge of the platform E, a straight groove E' is provided; in the bottom of which a metal plate M, having bent up ends $m$, is securely fastened. Revolubly mounted in the bent up ends $m$, I provide a screw N, carrying at one end thereof a pinion N' meshing in the gear wheel N² journaled at $n^3$ beneath the platform E and driven by the hand crank $n^2$. Mounted on this screw N, and held against turning thereon, are the nuts P and P' which are adjustably connected together by means of the adjusting screws P³, screwthreaded as at $p^3$ to engage in one of said nuts, as P', and revolubly connected by means of the loop $p'$ and heads $p^2$ to the other nut, as P, as shown most clearly in Fig. 7. The object in so adjustably securing the nuts together is to take up any lost motion due to wear of the threads on the nuts or on the screw N. One of these nuts as P is provided with a pivot-pin $p$ on which the block F, and the azimuth plates K and K' are pivoted, as shown most clearly in Fig. 4.

It will be seen that the azimuth plates may be moved laterally by merely turning the hand crank $n^2$, while the prolongation F' of the block F fitting in the curved groove E⁰ will cause the line $x\ x$ of Fig. 1 to move in the paths of successive radii of the circle of which the said groove E⁰ is an arc.

For most of the measurements with the herein described instrument, the segment of a circle E⁰, and corresponding guide piece F′, engaging therein, may be omitted. The platform E which is pivoted at e is swung through an arc about said pivot by means of the screw Q which is preferably provided with a graduated circle Q′ at one end thereof, and is revolved by a hand crank q′. This screw Q is revolubly mounted in bearings $b^2$ fast to the platform B. The said screw Q passes through nuts R and R′ adjustably connected together in a similar way to the nuts P and P′ already described with reference to Fig. 7. The nut R has a lug r which engages in a slot e′ arranged longitudinally in the base of the platform E. This lug r has a longitudinal play in the said slot e′, but no lateral play therein, and hence there is no lost motion between the revolution of the screw Q and the swinging of the platform E. This screw Q is preferably set at right angles to the screw N.

Parallel to the screw Q, and connected to the platform B, I provide a scale $b^0$ which indicates the distance over which the pivoted plate E has been swung from the initial position. For the more accurate reading of this scale $b^0$ a vernier $r^0$ is carried by the nut R, which moves with the platform E.

In order to indicate the number of turns and parts of turns of the screw Q, the wheel Q′ at the end thereof is graduated, and it is read with the assistance of the vernier $b^{00}$ secured to the platform B.

On the rear edge of the platform E, a scale $e^0$ is provided, from which is read the distance that the azimuth plates are moved laterally. This scale $B^0$ is read with the assistance of the vernier $p^0$ projecting from the nut P as shown in Figs. 2 and 7.

On one edge of the curved groove $E^0$ a scale $e^{00}$ is provided, and a vernier $f^{00}$ on the block F indicates the angular motion of the said block along the said groove.

The motion of the azimuth plates along the line x x of Fig. 1 is indicated by the scale $f^0$ on the block F, which is read by means of the vernier $h^0$ on the block H. This scale $f^0$ and vernier $h^0$ would rarely be used in practice, and may be omitted if desired.

The operation of the instrument is as follows:—For convenience of manipulation, the theodolite should be moved to the left hand end of the screw N and the scale $e^0$ should be so adjusted that it should read 0 when the pivot center of the theodolite coincides with the pivot center of the platform E. In this position the telescope may be swung around about its own pivot and azimuth angles may be read in the usual way. For measuring distances, several different methods may be adopted with the herein described instrument, some of which are described in the diagrams shown in Figs. 8 to 11. In these various diagrams let T represent the target or object whose distance is to be determined. Let t, t′, and $t^2$ indicate various positions of the telescope. Let d represent the distance between the pivot centers of the telescope from the initial to the final position of the same. Let D′ represent the distance of the object T from the telescope in the initial position, and let D indicate the corresponding distance of the object from the telescope in its final position. Let the various angles be indicated by the Greek letters $\theta$, $\varphi$, and $\psi$. Now, referring especially to Fig. 8, let the axis of collimation of the telescope be laid at right angles to the line t t′ and then let the platform E be swung by means of the screw Q so that the telescope will bear on the target. Then move the telescope by means of the screw N through any noted distance d and again sight at the target. Then the telescope will be revolved through the angle $\theta$, and D′=d cot. $\theta$; or D=d cosec. $\theta$. Where either d or $\theta$ is constant, the scale $e^0$ may be calibrated to read distances, or if the pitch of the screw N be known then it will be evident that the distances d and also D will be functions of the number of turns of the screw.

In Fig. 9, the axis of collimation of the telescope is represented as making oblique angles $\psi$ and $\varphi$ with the line t t′, and noting both these angles, we have—$\theta=180-(\varphi+\psi)$, and D=d sin. $\psi$ cosec. $\theta$, also D′=d sin. $\varphi$ cosec. $\theta$; which may be readily computed when d is noted and $\psi$ and $\varphi$ are observed.

In Fig. 10 the telescope is laid at right angles to the line t t′ and then the platform E is moved so that the telescope bears on the target. Now the telescope is moved by means of the screw N until it has traveled from the position 1 to 2 and points in the direction t′ T′. Now if the platform E be swung about its pivot by means of the screw Q until the telescope points at the object T as in the position 3, it will be obvious that the axis of collimation of the telescope will be a tangent to the arc $t^2$ t′ and therefore the angle $t^2$ T t = $t^2$ t t′=; and if p be the perpendicular distance the telescope has been moved then sin. $\theta=\frac{p}{d}=\frac{d}{D'}$ $\therefore$ D′=$\frac{d^2}{p}$; or in terms of $\theta$, D′=d cosec. $\theta$, or D=d cot. $\theta$; or D′ sin. $\theta$=p cosec. $\theta$ $\therefore$ D′=p cosec. $^2\theta$, from which, if d be constant, the distance may be calibrated along the scale $b^0$, or in terms of $\theta$ by means of the revolutions and parts of revolutions of the screw Q.

It will be obvious that, in the foregoing methods of using the instrument, no consideration whatever has been paid to the arc-shaped curve $E^0$, and for the purposes of such measurement, this arc-shaped curve may be omitted entirely from the instrument.

In the method of measuring distances shown in Fig. 11, the curve $E^0$ performs an important part. Thus suppose the telescope to be pivoted at the target as shown in the position 1. Now turn the telescope to the position 2, about the pivot center of the theodolite, through any desired angle $\theta$, or until it points in the direction t $T^2$. Now move the telescope from the position 2 along the line t t′ by means of the screw N, and stop turning the screw N the instant the axis of collimation of the telescope bears on the object T. The line $xx$ moves in the direction of successive radii of the circle whose center is $T^0$ and of whose circumference $E^0$ is an arc; but the telescope being set at an angle $\theta$ to this line $xx$, when it swings into the position 3 bearing on the object T, will still be at the same angle with the radius of the circle drawn through its center, and therefore the angle $T\ t'\ T^3 =$ angle $\theta$, or if $\varphi =$ angle $t\ T^0\ t''$, which is measured by the arc $E^0$ moved over, then the angle $t\ T\ t' = \theta - \varphi$, and $D = d$ cosec. $(\theta - \varphi)$ or $D' = d$ cot. $(\theta - \varphi)$. Now $\theta$ being constant, there is a fixed value for D (or D') corresponding to each value of $d$, and $d$ may be calibrated; or expressing the same equations in terms of $\varphi$ and R, since $d = R$ sin. $\varphi$, then $D = R$ sin. $\varphi$ cosec. $(\theta - \varphi)$ or $D' = R$ sin. $\varphi$ cot. $(\theta - \varphi)$, from which equations, making $\theta$ and R constant, we may calibrate the instrument along the scale $e^{00}$ for distances indicated by variations in $\varphi$.

The foregoing represents the theory of the operation of the instrument.

It is obvious that the instrument might be modified in many non-essential details by any skilled instrument maker, without departing from the spirit of my invention.

Having thus described my invention, what I claim, and desire to secure by Letters Patent of the United States, is—

1. In a distance measuring instrument, the combination with a support, of a pivoted platform mounted on said support, with a groove in the form of a segment of a circle provided in the top of the platform, a block having a downwardly projecting tongue fitting closely in said groove; a screw revolubly mounted in said platform and means for turning said screw, and a theodolite or surveyor's transit having its azimuth plate or plates pivoted in said block above said screw and adapted to move along the said screw, substantially as described.

2. In a distance measuring instrument, the combination with a suitable support and a platform mounted thereon, with a screw revolubly mounted in said platform, of a second platform mounted over the first and adapted to swing about a pivot provided near the end opposite from said screw, and having a nut engaging in said screw; with a groove in the form of a segment of a circle provided in said upper platform, of a second screw revolubly mounted in said second platform and extending from said pivot toward said lower screw; a block mounted above said upper screw and provided with a nut engaging the said screw; a tongue projecting downward from said block and fitting closely in said circular groove, and a sighting instrument pivoted in said block over said upper screw and adapted to be moved along the said screw, substantially as and for the purposes described.

3. In a distance measuring instrument, the combination with a suitable support and a platform mounted thereon, with a screw set transversely on said platform and revolubly mounted therein; of a second platform mounted over and pivoted to the first, a nut attached to said platform and engaging said screw, with a groove in the form of a segment of a circle provided in said upper platform; a second screw revolubly mounted in said second platform and extending from said pivot toward said lower screw, a block mounted above said upper screw and provided with a nut engaging the said screw; a tongue projecting downward from said block and fitting closely in said circular groove, and a sighting instrument pivoted in said block over said upper screw and provided with a downwardly projecting nut engaging said upper screw, and means for turning both of said screws, substantially as described.

4. In a distance measuring instrument, the combination with a suitable support and a platform mounted thereon, with a screw set transversely on said platform and revolubly mounted therein; of a second platform mounted over and pivoted to the first, a nut attached to said platform and engaging said screw; with a groove in the form of a segment of a circle provided in said upper platform; a second screw revolubly mounted in said second platform and extending from said pivot toward said lower screw, a block mounted above said upper screw and provided with a nut engaging the said screw; a tongue projecting downward from said block and fitting closely in said circular groove, a sighting instrument pivoted in said block over said upper screw and provided with a downwardly projecting nut engaging said upper screw, a graduated circle and hand crank at the end of said lower screw, a pinion at the end of said upper screw, and a hand crank and gear wheel for turning said pinion, substantially as described.

5. In a distance measuring instrument, the combination with a support, of a pivoted platform mounted on said support, with a groove in the form of a segment of a circle provided in the top of said platform, a block having a downwardly projecting tongue fitting closely in said groove; a nut formed in two parts with adjusting screws connecting the said parts, one of said parts being pivotally connected to said block; a screw mounted in said platform and means for turning said screw, and a centrally pivoted sighting instrument mounted in said block over said screw and moved by said nut, along the said screw, substantially as described.

6. In a distance measuring instrument, the combination with a suitable support and a platform mounted thereon, with a screw revolubly mounted in said platform, of a second platform mounted over the first and adapted to swing about a pivot provided near the end opposite from said screw, a nut engaging in said screw; and formed in two parts with adjusting screws connecting the said parts, one of said parts being pivotally connected to said upper platform; with a groove in the form of a segment of a circle provided in said upper platform, of a second screw revolubly mounted in said second platform and extending from said pivot toward said lower screw; a block mounted above said upper screw; a nut engaging in the said screw; pivotally attached to said block and formed in two parts with adjusting screws connecting the said parts; a tongue projecting downward from said block and fitting closely in said circular groove, and a sighting instrument pivoted in said block over said upper screw and adapted to be moved along the said screw, substantially as and for the purposes described.

In testimony whereof I affix my signature in presence of two witnesses.

JEFFERSON L. BUFORD.

Witnesses:
D. J. PONCELER,
W. B. MORGAN.